United States Patent
Waite et al.

(10) Patent No.: US 9,791,993 B2
(45) Date of Patent: Oct. 17, 2017

(54) SYSTEM, METHOD AND COMPUTER PROGRAM PRODUCT FOR CREATING A RE-USABLE COMPONENT UTILIZING A MULTI-TENANT ON-DEMAND DATABASE SERVICE

(71) Applicant: salesforce.com, inc, San Francisco, CA (US)

(72) Inventors: Andrew Waite, Novato, CA (US); Douglas Chasman, Pittsford, NY (US)

(73) Assignee: salesforce.com, inc, San Francisco, CA (US)

( * ) Notice: Subject to any disclaimer, the term of this patent is extended or adjusted under 35 U.S.C. 154(b) by 367 days.

(21) Appl. No.: 13/866,830

(22) Filed: Apr. 19, 2013

(65) Prior Publication Data
US 2013/0239029 A1   Sep. 12, 2013

Related U.S. Application Data

(63) Continuation of application No. 12/463,237, filed on May 8, 2009, now abandoned.

(60) Provisional application No. 61/051,592, filed on May 8, 2008.

(51) Int. Cl.
| G06F 17/00 | (2006.01) |
| G06F 3/048 | (2013.01) |
| G06F 17/22 | (2006.01) |
| G06F 9/44 | (2006.01) |

(52) U.S. Cl.
CPC ........... *G06F 3/048* (2013.01); *G06F 8/36* (2013.01); *G06F 17/00* (2013.01); *G06F 17/2247* (2013.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

U.S. Appl. No. 60/828,192, filed Oct. 4, 2006.

(Continued)

*Primary Examiner* — Keith Bloomquist
(74) *Attorney, Agent, or Firm* — Haynes Beffel & Wolfeld LLP; Ernest J. Beffel, Jr.

(57) ABSTRACT

In accordance with embodiments, there are provided mechanisms and methods for creating a re-usable component for use in association with a multi-tenant on-demand database service. These mechanisms and methods for creating a re-usable component for use in association with a multi-tenant on-demand database service can allow the re-usable component to be utilized by multiple tenants of the multi-tenant on-demand database service.

22 Claims, 6 Drawing Sheets

(56) References Cited

U.S. PATENT DOCUMENTS

| | | | |
|---|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,529,728 B2 | 5/2009 | Weissman et al. |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,774,366 B2 | 8/2010 | Fisher et al. |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,065,594 B2 | 11/2011 | Limberg |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,533,229 B2 | 9/2013 | Choi et al. |
| 8,549,417 B2 | 10/2013 | Waite et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0033284 A1* | 2/2003 | Warren ............ G06F 17/30716 |
| | | 707/E17.093 |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0020578 A1* | 1/2006 | Hood .................... G06F 9/4435 |
| 2006/0021019 A1 | 1/2006 | Hinton et al. |
| 2006/0150147 A1* | 7/2006 | Tatsubori ................. G06F 8/36 |
| | | 717/108 |
| 2006/0206834 A1* | 9/2006 | Fisher ............... G06F 17/30528 |
| | | 715/777 |
| 2007/0079282 A1* | 4/2007 | Nachnani et al. ............ 717/106 |
| 2007/0088741 A1 | 4/2007 | Brooks et al. |
| 2007/0118844 A1 | 5/2007 | Huang et al. |
| 2007/0130130 A1 | 6/2007 | Chan et al. |

(56) References Cited

U.S. PATENT DOCUMENTS

| | | |
|---|---|---|
| 2007/0250531 A1 | 10/2007 | Wiggins et al. |
| 2008/0010243 A1 | 1/2008 | Weissman et al. |
| 2008/0249972 A1 | 10/2008 | Dillon |
| 2009/0037828 A1 | 2/2009 | Waite et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0248740 A1* | 10/2009 | McCormack ..... G06F 17/30289 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

OTHER PUBLICATIONS

Final Rejection Office Action, U.S. Appl. No. 12/463,237, SALE 1089-2 (abandoned), dated Jan. 31, 2014, 12 pages.
Final Rejection Office Action, U.S. Appl. No. 12/463,237, SALE 1089-2 (abandoned), dated Jul. 19, 2012, 15 pages.
Final Rejection Office Action, U.S. Appl. No. 12/463,237, SALE 1089-2 (abandoned), dated Oct. 4, 2011, 13 pages.
Non Final Rejection Office Action, U.S. Appl. No. 12/463,237, SALE 1089-2 (abandoned), dated Jul. 31, 2013, 15 pages.
Non Final Rejection Office Action, U.S. Appl. No. 12/463,237, SALE 1089-2 (abandoned), dated Jan. 20, 2012, 15 pages.
Non Final Rejection Office Action, U.S. Appl. No. 12/463,237, SALE 1089-2 (abandoned), dated Apr. 29, 2011, 12 pages.

* cited by examiner

SYSTEM, METHOD AND COMPUTER PROGRAM PRODUCT FOR CREATING A RE-USABLE COMPONENT UTILIZING A MULTI-TENANT ON-DEMAND DATABASE SERVICE

CLAIM OF PRIORITY

This application is a continuation of U.S. application Ser. No. 12/463,237, filed May 8, 2009, which claims the benefit of U.S. Provisional Patent Application No. 61/051,592, filed May 8, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to re-usable components, and more particularly to creating re-usable components.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Traditionally, re-usable components have included pre-defined components that are available for use by developers in creating content (e.g. interfaces, etc.). Thus, developers may insert, reference, etc the re-usable components with respect to content being developed. Unfortunately, techniques for creating re-usable components have generally been associated with various limitations.

For example, re-usable components have customarily only been associated with a single entity. Accordingly, a single instance of a re-usable component has been incapable of being shared across multiple entities. As another example, re-usable components have conventionally been created to be non-programmable (e.g. incapable of accepting parameters), etc.

BRIEF SUMMARY

In accordance with embodiments, there are provided mechanisms and methods for creating a re-usable component utilizing a multi-tenant on-demand database service. These mechanisms and methods for creating a re-usable component utilizing a multi-tenant on-demand database service can allow the re-usable component to be utilized by multiple tenants of the multi-tenant on-demand database service.

In an embodiment and by way of example, a method is provided for creating a re-usable component utilizing a multi-tenant on-demand database service. In use, a name and a definition are provided for a re-usable component. Furthermore, the re-usable component is created based on the name and the definition, utilizing a multi-tenant on-demand database service, utilizing the name and the description.

While the present invention is described with reference to an embodiment in which techniques for creating re-usable components using an on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for creating a re-usable component utilizing a multi-tenant on-demand database service.

To date, re-usable components have been created for use by a single entity. Unfortunately, this has prevented single instances of re-usable components from being shared. Thus, mechanisms and methods are provided herein for creating a re-usable component utilizing a multi-tenant on-demand database service and can enable use of the re-usable components among a plurality of tenants of the on-demand database service.

Next, mechanisms and methods for creating a re-usable component utilizing a multi-tenant on-demand database service will be described with reference to exemplary embodiments.

Figure 1:
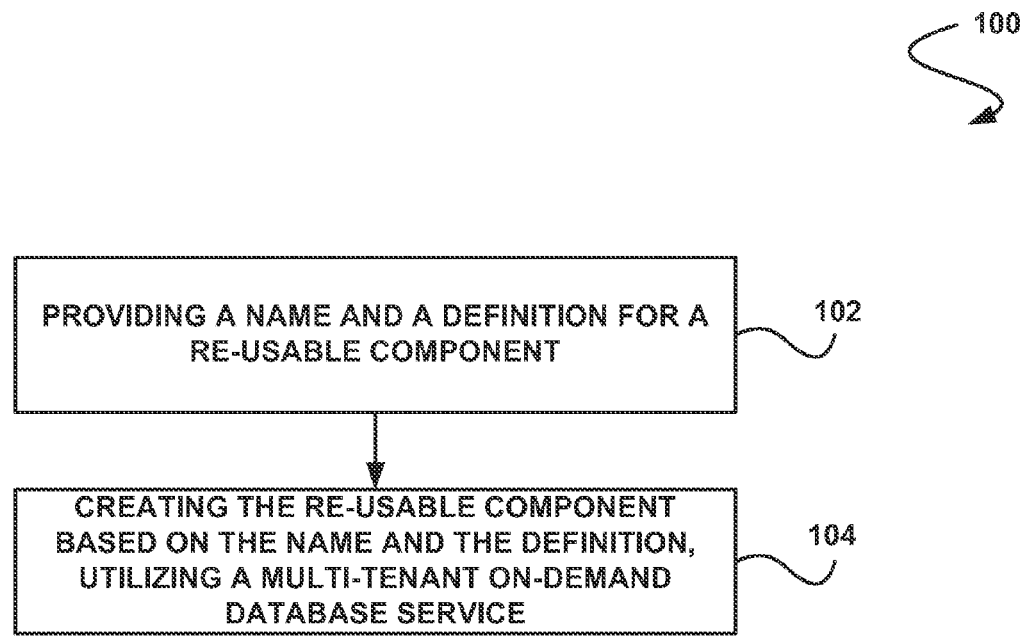
FIG. 1 shows a method for creating a re-usable component utilizing a multi-tenant on-demand database service, in accordance with one embodiment.

FIG. 1 shows a method 100 for creating a re-usable component utilizing a multi-tenant on-demand database service, in accordance with one embodiment. As shown, a name and a definition are provided for a re-usable component. See operation 102. With respect to the present embodiment, the re-usable component may include any predefined component capable of being utilized multiple times.

For example, the re-usable component may include a predefined component (e.g. code, etc.) capable of being implemented in content. Such content may optionally include an interface [e.g. a user interface, such as a graphical user interface (GUI)], an application, etc. In addition, implementing the re-usable component in the content may include providing in the interface (e.g. code of the interface) a reference to the re-usable component, utilizing the re-usable component to generate the content, etc. To this end, the re-usable component may include code capable of being utilized with respect to various different content (e.g. multiple different interfaces, applications, etc.).

In one embodiment, the re-usable component may include a template of a component. For example, the re-usable component may be customizable (e.g. by a user). As another example, the re-usable component may be customized for the content in which it is implemented. Optionally, the customization may include integrating the re-usable component with another component of the interface, code of the interface, etc. (e.g. by referencing in the re-usable component at least a portion of the interface). Just by way of example, the re-usable component may be configured to receive input entered into a portion of an interface.

In another embodiment, the re-usable component may include code, which when executed, performs a function. The function may include processing input received by the re-usable component (e.g. received from the interface, received from a database, etc.), as an option. Just by way of example, the processing may include presenting the input in a predetermined manner (e.g. via an ordered list, etc.), analyzing the input, etc.

Accordingly, as noted above, the name and the definition are provided for the re-usable component. With respect to the present description, the name and the definition are provided for creating the re-usable component, as described in more detail below with respect to operation 104.

It should be noted that the name may include any identifier of the re-usable component. For example, the name may be utilized for identifying, referencing, calling, etc. the re-usable component. In one embodiment, the name may include a unique identifier of the re-usable component.

Further, the definition may include any statements, variables, etc. that define a usability of the re-usable component. In one embodiment, the definition may include at least one attribute. The attribute may indicate a parameter of a predetermined type that is capable of being input to the re-usable component. As another option, the attribute may indicate a parameter of the re-usable component that is capable of being accessed (e.g. via an interface in which the re-usable component is integrated, etc.). Thus, the attribute may be used by the re-usable component for receiving input (e.g. to be processed or otherwise used by the re-usable component). Just by way of example, the attribute may include an attribute name (e.g. an identifier of the attribute) and a type identifier of the attribute (e.g. string, etc.).

In another embodiment, the definition may include a predefined area of the re-usable component for receiving input of an unspecified type (e.g. any desired type). As an option, the predefined area may be accessed (e.g. for customizing, for referencing, etc.) utilizing a name assigned thereto by the definition. Thus, the re-usable component may optionally be customized by inputting code, a reference to another re-usable component, etc. into the re-usable component at the predefined area.

In yet another embodiment, the definition may include an unspecified area of the re-usable component for receiving input of an unspecified type. Optionally, the unspecified area of the re-usable component may be customized by entering code, a reference to another re-usable component, etc. into the re-usable component. In addition, since the area in which such customization may be included is unspecified, the customization may be provided in any portion of the re-usable component. As another option, the unspecified area may be defined in the re-usable component (e.g. via the definition) utilizing a standard (e.g. predefined, etc.) name to be utilized for an unspecified area of any re-usable component.

In other embodiments, the definition may include references to other re-usable components, such that the definition may allow the re-usable component to utilize other re-usable components (e.g. the functionality of other re-usable components). For example, the definition may include a reference to a standard re-usable component (e.g. non-customizable re-usable component) and/or a customizable re-usable component.

Of course, the definition may also include any desired code (e.g. for imparting functionality to the re-usable component), such as any mark-up language code or other code that is supported by applications (e.g. web browsers) implementing the content including the re-usable component. For example, the definition may include code written utilizing JavaScript™, hypertext markup language (HTML), Adobe® flash, etc. Just by way of example, the code may process input received by the re-usable component (e.g. via an attribute of the re-usable component), present the input or processed input in a predetermined manner, etc.

In still yet another embodiment, the name and the definition may be provided in any desired manner. In one example, the name and/or the definition may be provided by a user for creating the re-usable component. Optionally, the user may utilize a user interface for providing (e.g. entering, inputting, etc.) the name and/or definition. The user interface may be of a multi-tenant on-demand database service (e.g. which is capable of creating the re-usable component utilizing the name and definition, as described below with respect to operation 104).

In another example, the name and/or the definition may be automatically provided. Just by way of example, the name of the re-usable component may be automatically generated based on a next unique identifier in a sequence of unique identifiers that is not yet used to refer to any other re-usable component. The name may be automatically generated in response to a user request to create a re-usable component, as an option. As another example, the definition may be automatically provided utilizing a predetermined re-usable component template. Optionally, in response to a user making a reference to the as of yet uncreated re-usable component within another re-usable component, the definition of the as of yet uncreated re-usable component may be automatically generated for use in creating the re-usable component (e.g. such that the reference made by the user may be enabled by a created re-usable component).

Furthermore, the name and definition may be provided in any format. In one embodiment, the name and definition may be provided as text. For example, the name and definition may be provided as input to input fields of an interface. In another embodiment, the name and definition may be provided as code (e.g. utilizing a mark-up language).

Moreover, as shown in operation 104, the re-usable component is created based on the name and the definition, utilizing a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers. Various examples of such a multi-tenant on-demand database service will be set forth in the context of different embodiments that will be described during reference to subsequent figures.

In one embodiment, the multi-tenant on-demand database service may be used to create the re-usable component such that the multi-tenant on-demand database service creates the re-usable component based on the name and the definition. For example, the multi-tenant on-demand database service may include a development application which uses the name and the definition to create the re-usable component.

Optionally, as noted above, the multi-tenant on-demand database service may also include the interface via which the name and definition for the re-usable component are provided. For example, the name and definition may be provided over the network to the multi-tenant on-demand database service via the interface of the multi-tenant on-demand database service. As another option, a database of the multi-tenant on-demand database service may store the re-usable component once created, for allowing tenants of the multi-tenant on-demand database service to access, utilize, customize, etc. the re-usable component. In this way, the multi-tenant on-demand database service may be utilized for designing, creating, and maintaining the re-usable component.

It should be noted that the re-usable component may be created in any manner that is based on the name and the definition provided for the re-usable component. In one embodiment, the re-usable component may be created by correlating the definition with the name. For example, the re-usable component may be defined using the name and the definition.

In one optional embodiment where the name and the definition are provided as text, the re-usable component may be created by converting the text of the name and the definition to code (e.g. written in a mark-up language) and defining the re-usable component using the code. In another optional embodiment where the name and the definition are provided as code (e.g. written in a mark-up language), the re-usable component may be created by defining the re-usable component using the code. Thus, the re-usable component may optionally be created utilizing a mark-up language (e.g. by defining the re-usable component in a mark-up language using the name and the definition). For example, the re-usable component may be created utilizing tags (e.g. where the name and the definition are included in the re-usable component as tags).

To this end, the re-usable component may be created for use thereof in any number of different content. For example, tenants of the multi-tenant on-demand database service may access the re-usable component (e.g. via the multi-tenant on-demand database service) and may further use the re-usable component for generating content (e.g. may insert the re-usable component into the content for providing the functionality of the re-usable component in the content). By creating a re-usable component in the manner described above for allowing the re-usable component to be utilized for various content, any content including the re-usable component may be automatically updated by updating the re-usable component (e.g. thus providing ease in maintaining the content whether design changes or error fixes are made through the re-usable component). For example, fixing an error in the component may allow errors in all content resulting from the inclusion of such component to be automatically fixed.

Figure 2:
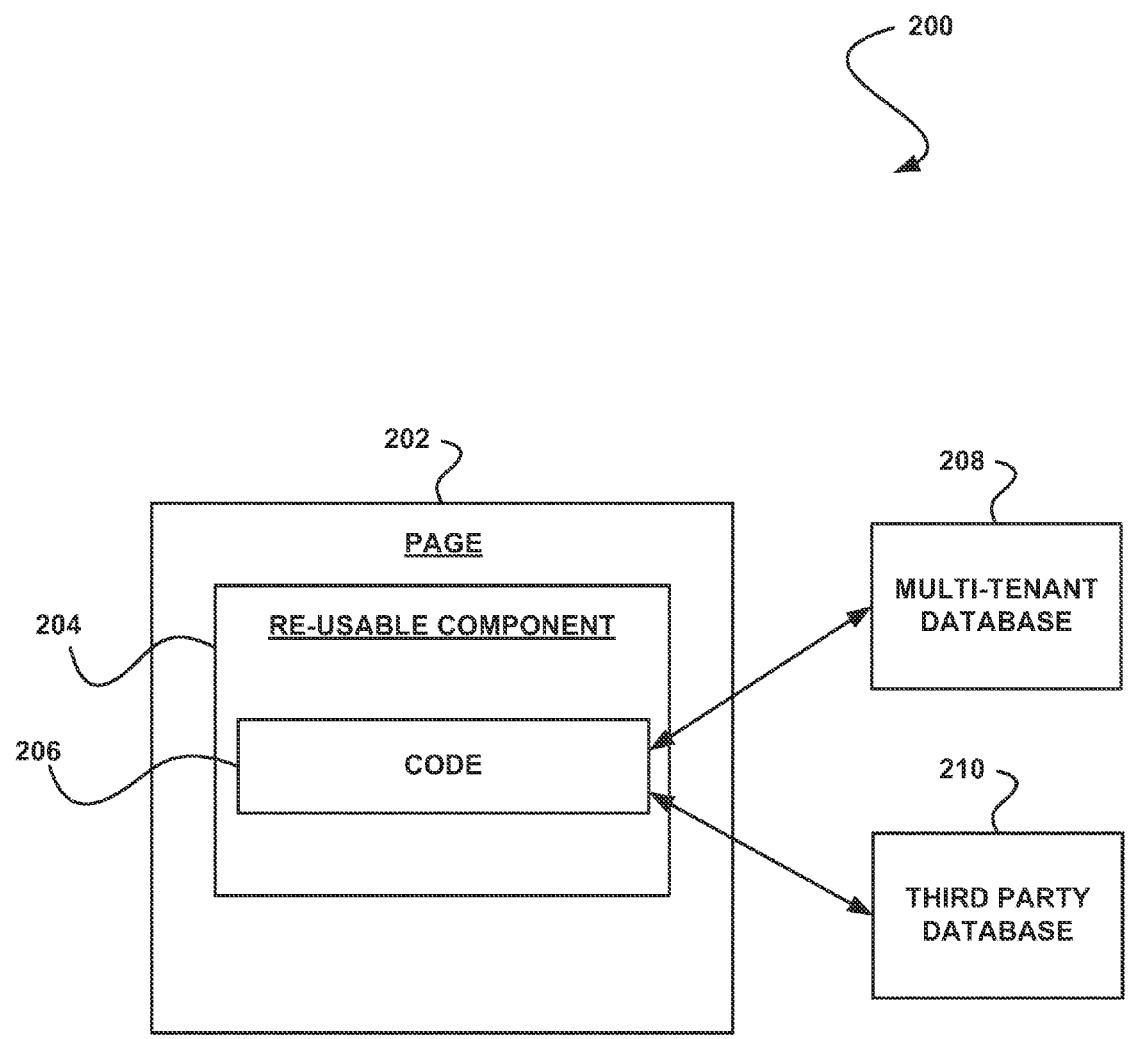
FIG. 2 shows a system in which a created re-usable component is implemented, in accordance with another embodiment.

FIG. 2 shows a system 200 in which a created re-usable component is implemented, in accordance with another embodiment. As an option, the present system 200 may be implemented in the context of the functionality of FIG. 1. Of course, however, the system 200 may be implemented in any desired environment. The aforementioned definitions may apply during the present description.

As shown, a page 202 includes a re-usable component 204. With respect to the present embodiment, the page 202 may include any interface for presenting content to a user. For example, the page 202 may include a web page displayed utilizing a web browser.

The page 202 may be configured to include the re-usable component 204. For example, a developer of the page 202 may modify code of the page 202 to include the re-usable component 204. In one embodiment, the page 202 may include the re-usable component 204 by referencing the re-usable component 204 (e.g. referencing the re-usable component 204 using a name of the re-usable component 204).

Additionally, the re-usable component 204 includes code 206 capable of being used by the page 202. With respect to the present embodiment, the code 206 includes at least a name of the re-usable component 204 and a definition of the re-usable component 204. To this end, the page 202 may reference the re-usable component 204 by its name such that the definition of the re-usable component 204 may be used in the page 202 for imparting functionality of the re-usable component 204 to the page 202.

Further, the code 206 of the re-usable component 204 is capable of accessing a multi-tenant database 208 of a multi-tenant on-demand database service and a third party database 210 (e.g. a database of a third party web service, etc.) over a network (not shown). For example, the code 206 may request data from the multi-tenant database 208 and/or the third party database 210. In one embodiment, the code 206 may receive input from the page 202 (e.g. from another portion of the page, such as an input field of the page via which a user enters the input) via an attribute included in a definition of the re-usable component 204. The code 206 may be configured to use the input to request data from the multi-tenant database 208 and/or the third party database 210, such that the code 206 may optionally process and then present the data received from the multi-tenant database 208 and/or the third party database 210 to the page 202 for display thereof.

Table 1 shows one example of a re-usable component that may be included in a page. It should be noted that such re-usable component is set forth for illustrative purposes only, and thus should not be construed as limiting in any manner.

TABLE 1

```
<apex:component name="orderedList" description="This component takes
a collection of strings and outputs it into an ordered list"
access="public">
<apex:attribute name="value" type="List<String>"/>
<ol>
<apex:repeat value="{!value}" var="s">
<li>{!s}</li>
</apex:repeat>
</ol>
</apex:component>
```

As shown in Table 1, the name of the re-usable component is "orderedList". The re-usable component includes an attribute "value" with an attribute type "List<String>" for receiving into the re-usable component a list of strings. The re-usable component also includes a reference to another standard re-usable component (shown as "repeat") which iterates over the list of strings. Further, the re-usable component includes code for presenting each string in the list of strings, as identified via the iteration, in an ordered list.

Table 2 shows an example of code in a page that references the re-usable component of Table 1. Again, it should be noted that such code is set forth for illustrative purposes only, and thus should not be construed as limiting in any manner.

TABLE 2

```
<c:orderedList value="{!mystrings}"/>
```

As shown in Table 2, the code of the page provides as input to the "value" attribute of the re-usable component "mystrings," which may include a list of strings retrieved from another portion of the page (e.g. an input field of the page, etc.).

Table 3 shows an example of re-usable component that may be included in a page. It should be noted that such re-usable component is set forth for illustrative purposes only, and thus should not be construed as limiting in any manner.

TABLE 3

```
<apex:component name="orderedList" description="This component takes
a collection of contacts and outputs the names into an ordered list"
access="global">
<apex:attribute name="value" type="List<Contact>"/>
<ol>
<apex:repeat value="{!value}" var="c">
<li><apex:outputText value="{!c.name}"/></li>
</apex:repeat>
</ol>
</apex:component>
```

As shown, the re-usable component in Table 3 is similar to the re-usable component in Table except the re-usable component in Table 3 includes an attribute "value" of attribute type "List<Contacts>" for receiving a list of contacts. In addition, the re-usable component in Table 3 includes code for output ting a pre-ordered set of contact names, where the list of contacts that are input to the re-usable component are provided in the order in which they will be output.

Table 4 shows an example of code in a page that references the re-usable component of Table 3. Again, it should be noted that such code is set forth for illustrative purposes only, and thus should not be construed as limiting in any manner.

TABLE 4

```
<c:orderdList value="{!mycontacts}"/>
```

As shown in Table 4, the code of the page provides as input to the "value" attribute of the re-usable component "mycontact," which may include a list of contacts retrieved from another portion of the page (e.g. an input field of the page, etc.).

As another option, instead of the re-usable component defining the output of each contact in the list, the re-usable component may be customized by a user to output the list of contacts is a different manner. The customization may be provided by virtue of an unspecified area of the re-usable component included in the definition of the re-usable component and referenced in the definition by a predefined name. For example, the user may insert code into any area of the re-usable code for specifying the manner in which the list of contacts is to be output.

Table 5 shows an example of code capable of being inserted into a defined unspecified area of the re-usable component for customizing the manner in which the list of contacts is to be output. Again, it should be noted that such code is set forth for illustrative purposes only, and thus should not be construed as limiting in any manner.

TABLE 5

```
<c:orderedList value="{!mycontacts}" var="c">
<b><apex:outputText value="{!c.name}"/></b>
</c:orderedList>
```

Table 6 shows a customized re-usable component in the code of Table 5 is used for customizing the manner in which the list of contacts is to be output. With respect to Table 6, the code of Table 5 is referenced as the "componentBody" tag. Again, it should be noted that such re-usable component is set forth for illustrative purposes only, and thus should not be construed as limiting in any manner.

TABLE 6

```
<apex:component name="orderedList" description="This component takes
a collection of contacts and outputs what the user specified in the body
of the tag into an ordered list" access="global">
<apex:attribute name="var"/>
<apex:attribute name="value" type="List<Contact>"/>
<ol>
<apex:repeat value="{!value}" var="v">
<li>
<apex:componentBody>
<apex:variable var="{!var}" value="{!v}"/>
</apex:componentBody>
</li>
</apex:repeat>
</ol>
</apex:component>
```

As another option, the list of contacts passed into the re-usable component may not necessarily be ordered and that the customization provided by the user is unchanged from Table 5. The re-usable component definition may be modified, as shown in Table 7, with the addition of a class and binding to the appropriate accessors in that class. It should be noted that the re-usable component shown in Table 7 is set forth for illustrative purposes only, and thus should not be construed as limiting in any manner.

TABLE 7

```
public class myComponentCon {
List<Contact> contactList;
public void setValues(List<Contact> cList) { this.contactList = cList;
}
public List<Contact> getOrderedValue( ) {
List<Contact> orderedList = new List<Contact>( );
//do sorting
return orderedList;
}
}
<apex:component name="orderedList" description="This component takes
a collection of contacts and outputs what the user specified in the body
of the tag into an ordered list" access="global"
controller="myComponentCon">
<apex:attribute name="var"/>
<apex:attribute name="value" type="List<Contact>"
assignTo="{!values}"/>
<ol>
<apex:repeat value="{!orderedValue}" var="v">
<li>
<apex:componentBody>
<apex:variable var="{!var}" value="{!v}"/>
</apex:componentBody>
</li>
</apex:repeat>
</ol>
</apex:component>
```

Table 8 shows an example of a defined attribute of a re-usable component. It should be noted that the defined attribute is set forth for illustrative purposes only, and thus should not be construed as limiting in any manner.

TABLE 8

```
<apex:attribute name="value" type="String" required="true"
assignTo="{!value}"/>.
```

Values passed into the re-usable component through the attributes of the re-usable component may be accessible from a controller of the component by defining an appropriate setter (set code module) for the attribute and binding it through the assign. To attribute.

Table 9 shows an example of a class of the re-usable component associated with Table 8. Again, it should be noted that the class is set forth for illustrative purposes only, and thus should not be construed as limiting in any manner.

TABLE 9

```
class myComponentController {
String value;
public void setValue(String s) { value = s; }
}
```

Accessing the same value from within the re-usable component may optionally be the same as though there is a getter (get code module) in the component controller. Table 10 illustrates one example of a defined attribute of a re-usable component which is accessed. It should be noted that the access to the defined attribute is set forth for illustrative purposes only, and thus should not be construed as limiting in any manner.

TABLE 10

```
<apex:attribute name="value" type="String" required="true"/>
<apex:outputText value="{!value}"/>
```

The re-usable component associated with the attribute shown in Table 10 may take the value argument and output it as if a user had just directly output the value of the attribute. Getters for value bindings in component markup may support either an attribute component tag (as shown in Table 10) or traditional binding to a getter in a controller class, as an option. These may thus be mutually exclusive binding mechanisms for which there may be a compile time check upon save of the re-usable component.

As an option, each re-usable component may be associated with a controller. Classes associated with a re-usable component may optionally directly query or execute data manipulation language (DML) operations. Thus, such operations may be handled by the controller associated with the re-usable component and may be exposed as action attributes on the component. Further, data supplied to the re-usable component by way of its attributes may, in turn, be used by the page directly or from the class associated to the re-usable component.

For example, if a user wanted to create a customized re-usable component that generated a sorted list of text values, the re-usable component would need to define an attribute for the collection of strings to sort and output in the page. The controller would then need to access the value of this attribute, sort the collection and return the sorted values back to the re-usable component for output.

Figure 3:
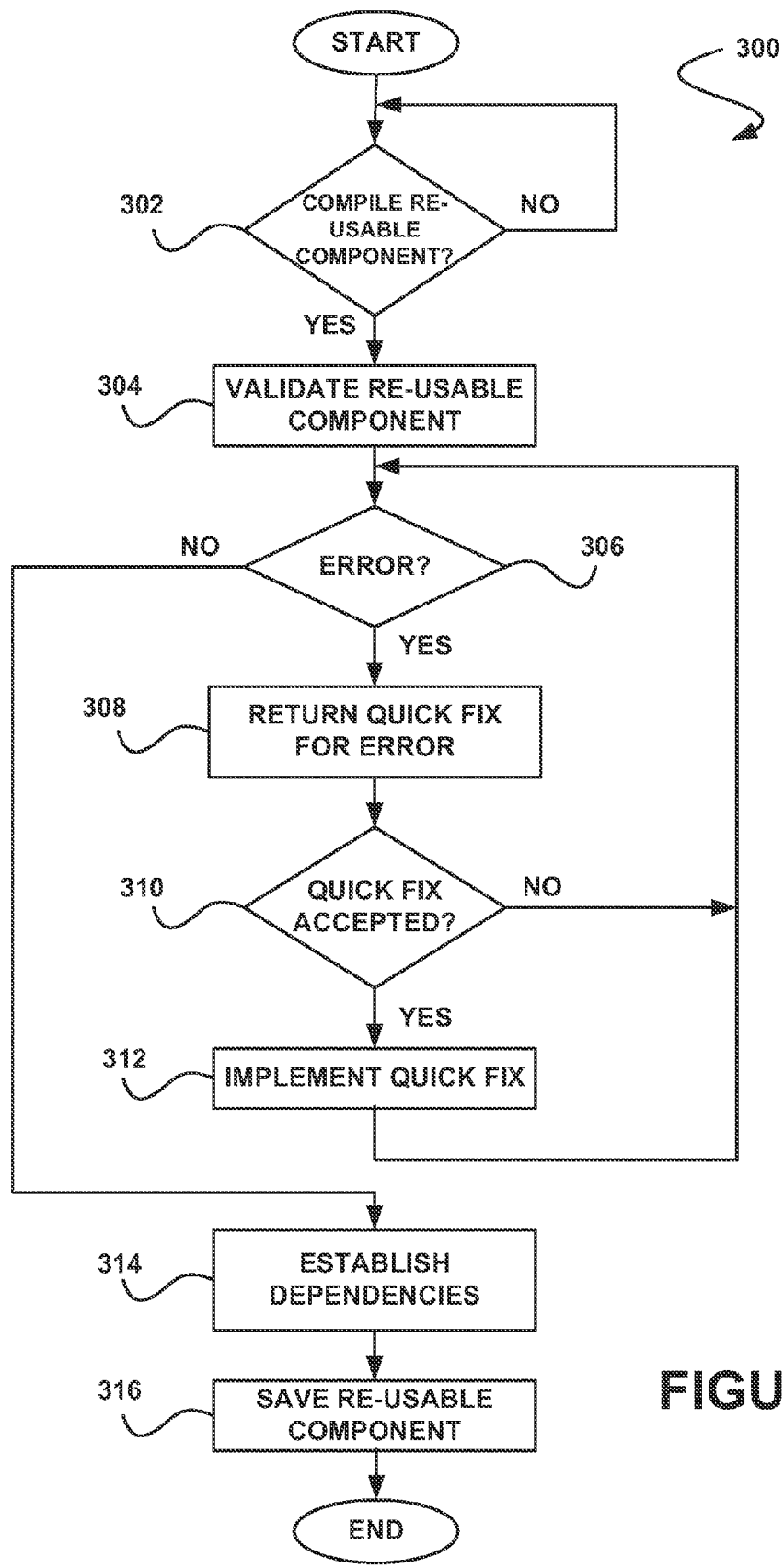
FIG. 3 shows a compile-time method for saving a re-usable component, in accordance with another embodiment.

FIG. 3 shows a compile-time method 300 for saving a re-usable component, in accordance with another embodiment. As an option, the compile-time method 300 may be carried out in the context of the functionality of FIGS. 1-2. Of course, however, the compile time method 300 may be carried out in any desired environment. Again, the aforementioned definitions may apply during the present description.

As shown, it is determined whether the re-usable component is to be compiled. See decision 302. In one embodiment, the re-usable component may be automatically compiled in response to a request to create the re-usable component or otherwise save a modification to the re-usable component (e.g. by a user, etc.). Thus, it may be determined that the re-usable component is to be compiled if a request to create or save the re-usable component has been received. It should be noted that the remaining operations described herein with respect to the present method 300 are performed during compilation of the re-usable component.

If it is determined that the re-usable component is not be compiled, the method 300 continues to wait for a determination that the re-usable component is to be compiled. If, however, it is determined that the re-usable component is to be compiled, the re-usable component is validated. See operation 304. In this way, the re-usable component may be created based on a validation of the re-usable component. The re-usable component may be validated by performing a plurality of validations upon the re-usable component. For each validation that is not true for the re-usable component, an error may be returned.

In one embodiment, the validation may include validating that attribute types of the re-usable component are defined types or primitives. In another embodiment, the validations may include validating that value binding expressions of the re-usable component are supported by the appropriate methods in a controller class of the re-usable component. In yet another embodiment, the validation may include validating that only one of a getter method (for retrieving data) and an attribute of the re-usable component are defined for a value binding expression. In a further embodiment, the validation may include validating that the name of the re-usable component is unique for the namespace in which it is used.

For example, the re-usable component may be validated by determining whether any other re-usable component referenced by the re-usable component exists. If it is determined that the re-usable component refers to another non-existent re-usable component, the validation of the re-usable component may return an error. In one exemplary embodiment, the re-usable component may require that it is a descendent in a tree from a form or may not require that it is a descendent of a form. It should be noted that when compiling the re-usable component, the page validation that asserts there is a form may optionally be skipped so a re-usable component with inputs can be plugged into a page with an existing form.

Additionally, it is determined whether an error has been returned as a result of the validation of the re-usable component. See decision 306. If it is determined that an error has been returned, a quick fix for the error is returned. Note operation 308. With respect to the present embodiment, the quick fix may include a predetermined function which, when executed, fixes the associated error.

In one embodiment, returning the quick fix may include presenting the quick fix to a user (e.g. via an interface). For example, a description of the error and a manner in which the error is to be fixed may be displayed to the user. Such user may include a user requesting to create or otherwise save the re-usable component.

In decision 310, it is determined whether the quick fix is accepted. The quick fix may be accepted by the user, for example, via the interface (e.g. by selecting an option on the interface to allow the quick fix to run. Of course, however, the quick fix may also be automatically run for fixing the error without any user intervention.

If it is determined that the quick fix is not accepted, the method 300 returns to decision 306 to determine if another error has been returned. Just by way of example, the error may be associated with value binding. However, a user may not necessarily want a quick fix for the value binding since the binding may be intended by the user to be a passthrough attribute on the re-usable component as opposed to a getter in the controller of the re-usable component.

If, it is determined that the quick fix is accepted, the quick fix is implemented. See operation 312. Implementing the quick fix may include running the quick fix, with respect to the present embodiment. Just by way of example, if the error includes a reference in the re-usable component to another re-usable component that is non-existent, the quick fix may include automatically creating the referenced re-usable component, such that the re-usable component is prevented from referring to a non-existent re-usable component.

Further, it is again determined if another error has been returned (decision 306). In this way, a quick fix may be returned for each error associated with the re-usable component. Once it is determined that no other errors have been returned, dependencies are established for the re-usable component. See operation 314. In one embodiment, the dependencies may include any references between re-usable components.

In another embodiment, the re-usable component includes an attribute of a type that is based on custom metadata (e.g. specific to a tenant of the multi-tenant on-demand database service which is creating or otherwise saving the re-usable component), a reference between the re-usable component and tit may optionally be ensured that any attribute types, other re-usable components, etc. referred to by the re-usable component may optionally be prevented from being deleted (thus eliminating the potential of errors being created in the re-usable component by virtue of an unsupported dependency). For example, a user may be required to remove a dependency prior to being allowed to delete any attribute types, other re-usable components, etc. associated with the dependency.

In various embodiments, establishing the dependencies may include adding new dependencies to the re-usable component and/or removing existing dependencies from the re-usable component. To this end, whether dependencies are added or removed may be based on current references/attributes in the re-usable component. As an option, once the dependences are established, the dependencies may be viewed by a detail page of the re-usable component. For example, the detail page of the re-usable component may depict attribute types, other re-usable components, etc. which refer to the re-usable component.

Still yet, the re-usable component is saved, as shown in operation 316. In this way, saving the re-usable component may include creating the re-usable component such that the same is stored in memory or updating the re-usable component such that the same is stored in memory. In one embodiment, the re-usable component may be saved in a database of the multi-tenant on-demand database service. In this way, tenants of the multi-tenant on-demand database service may optionally access the re-usable component for use thereof.

For example, the re-usable component may be deployed for use by tenants of the multi-tenant on-demand database service. Optionally, the re-usable component may be deployed based on permissions configured for the re-usable component. In one embodiment, the permissions may indicate that the re-usable component is only for use by the tenant employing the user that created the re-usable component. In another embodiment, the permissions may indicate that the re-usable component is for use by any tenant of the multi-tenant on-demand database service. Optionally, if the permissions indicate that the re-usable component is for use by any tenant of the multi-tenant on-demand database service, the code of the re-usable component may be obfuscated for protecting the intellectual property of the user that created the re-usable component and/or restrictions may be placed on the types of changes that the user may make to the re-usable component (e.g. for preventing potential errors from being created in content including the re-usable component).

Figure 4:
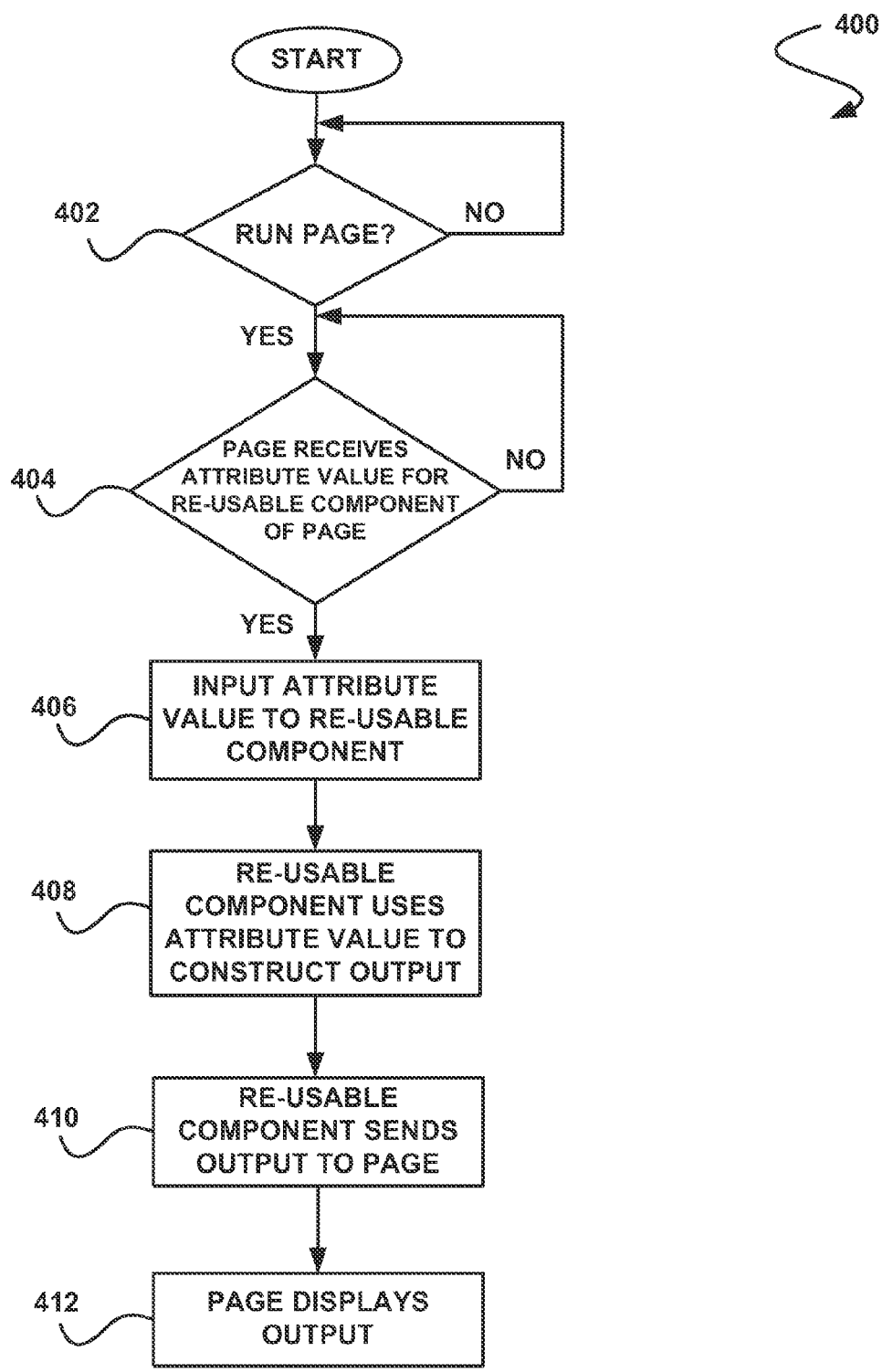
FIG. 4 shows a run-time method in which a re-usable component is utilized, in accordance with another embodiment.

FIG. 4 shows a run-time method 400 in which a re-usable component is utilized, in accordance with another embodiment. As an option, the run-time method 400 may be carried out in the context of the functionality of FIGS. 1-3. Of course, however, the run-time method 400 may be carried out in any desired environment. Yet again, the aforementioned definitions may apply during the present description.

As shown, it is determined whether a page is to be run. See decision 402. With respect to the present embodiment, the page may include any interface capable of displaying data. For example, the page may include a web page.

It may be determined that the page is to be run if the page is uploaded to a web server, in one embodiment. In another embodiment, it may be determined that the page is to be run if the page is accessed (e.g. via a web browser. If it is determined that the page is not to be run, the method 400 continues to wait for it to be determined that the page is to be run.

If, however, it is determined that the page is to be run, it is determined whether an attribute value for an attribute of a re-usable component of the page is received by the page. See decision 404. In one embodiment, determining whether the attribute value is received may include determining whether a user has entered input into an input field of the page, where the input field refers to the attribute value. In another embodiment, determining whether the attribute value is received may include determining whether another portion of the page (e.g. another re-usable component, etc.) which refers to the attribute value includes data capable of being passed to the re-usable component as the attribute value (e.g. that the data is of the type of the attribute, that the data is present in such other portion of the page, etc.).

If it is determined that the attribute value has not been received by the page, the method 400 continues to wait for the attribute value to be received. If, however, it is determined that the attribute value is received by the page, the attribute value is input to the re-usable component. See operation 406. For example, the attribute value may be passed to the re-usable component.

Further, the re-usable component uses the attribute value to construct output, as shown in operation 408. For example, code of the re-usable component may be used to perform any number of functions on the attribute value. In one embodiment, the re-usable component may use the attribute value to retrieve other data from a database (e.g. a database of a multi-tenant on-demand database service, a database of a third party service, etc.). In another embodiment, the re-usable component may use the attribute value to format the same (in addition to the data retrieved from a database, as an option) in a predetermined manner into the output. Of course, any desired processing may be performed upon the attribute value by the re-usable component.

Moreover, the re-usable component sends the output to the page, as shown in operation 410. The page then displays the output, as shown in operation 412. For example, the page may display the output using a browser via which the page is displayed.

System Overview

Figure 5:
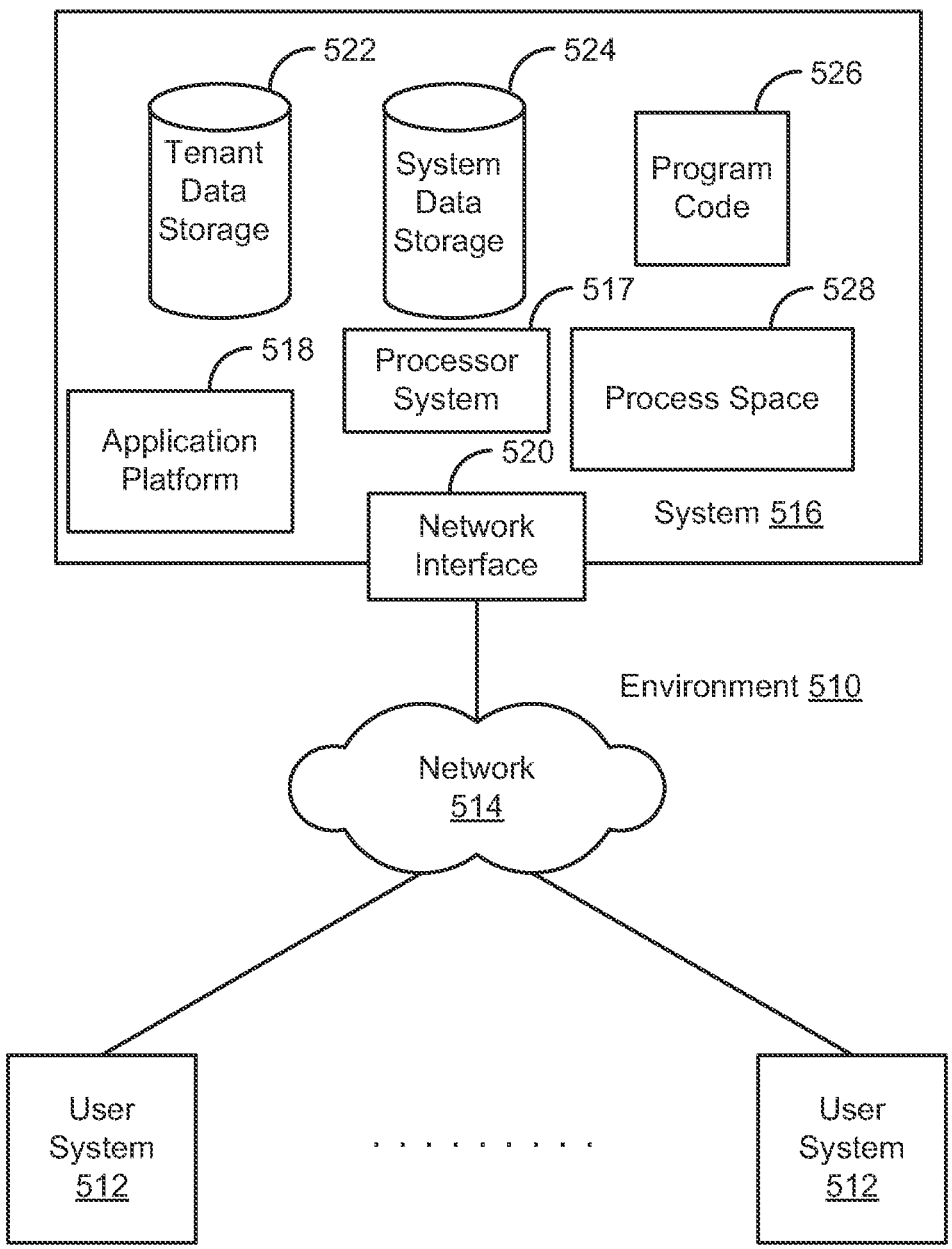
FIG. 5 illustrates a block diagram of an example of an environment wherein an on-demand database service might be used.

FIG. 5 illustrates a block diagram of an environment 510 wherein an on-demand database service might be used. As an option, any of the previously described embodiments of the foregoing figures may or may not be implemented in the context of the environment 510. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

Figure 6:
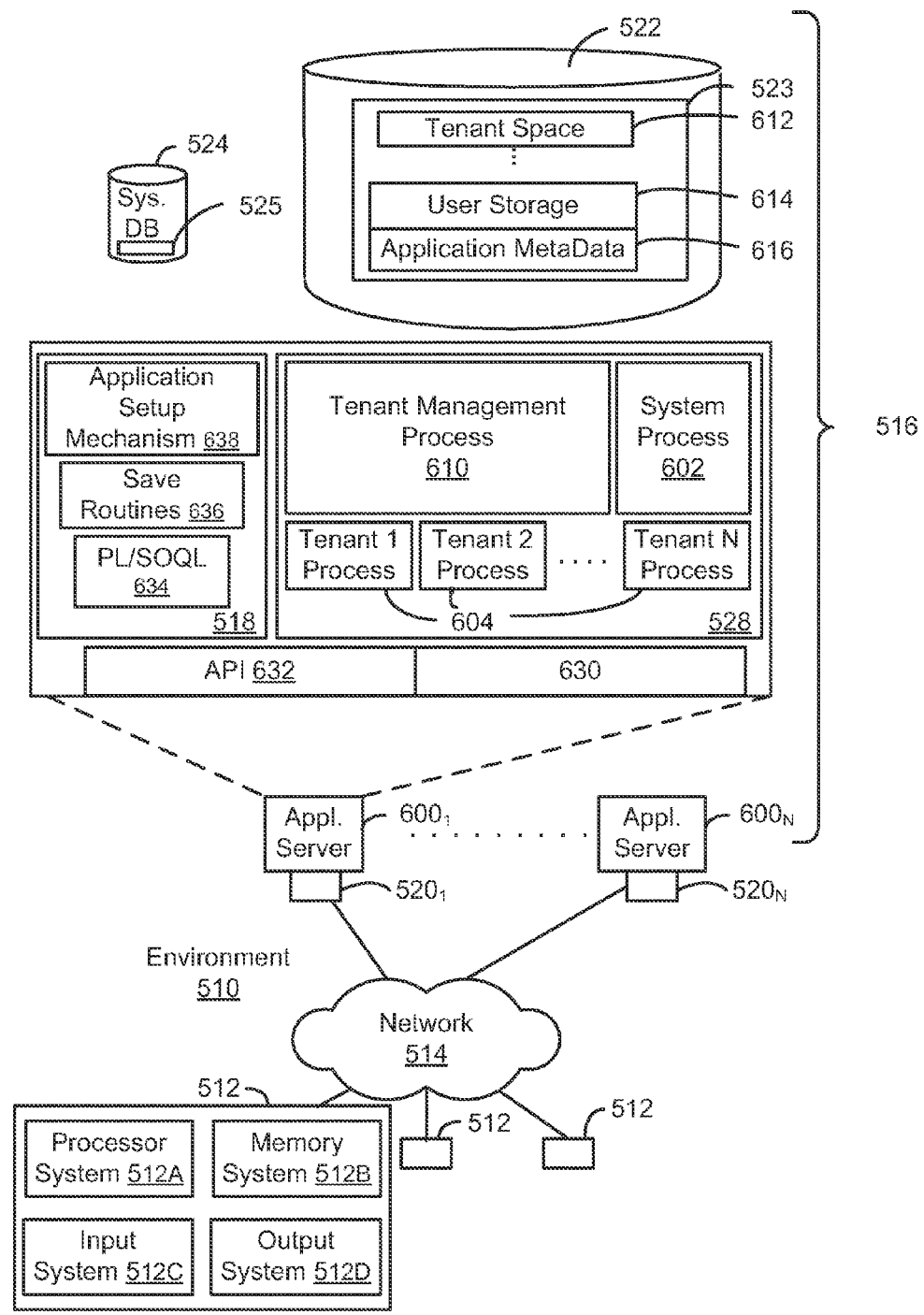
FIG. 6 illustrates a block diagram of an embodiment of elements of FIG. 5 and various possible interconnections between these elements.

One arrangement for elements of system 516 is shown in FIG. 6, including a network interface 520, application platform 518, tenant data storage 522 for tenant data 523, system data storage 524 for system data accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517 of FIG. 5, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/FP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another/e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610, Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600, In one embodiment, therefore, an interface system implementing aloud balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information, System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; and/or US 2009/0037828 titled "SYSTEM, METHOD AND COMPUTER PROGRAM PRODUCT FOR EDITING AN ON-DEMAND DATABASE SERVICE GRAPHICAL USER INTERFACE," filed Jul. 17, 2008, which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method of automatically creating a re-usable component for a user-interface, the method including:
   responsive to a user selection, automatically generating by a server of a shared on-demand database a re-usable component having access to one or more fields of the shared on-demand database based on a next unique identifier in a sequence of not yet used unique identifiers that are available and are valid for a specific client;
   wherein the re-usable component includes a code definition adopted from a pre-determined re-usable component template;
   presenting the re-usable component as an interface portion for display across an interface installed at and specific to a client;
   receiving from a user, customization code that modifies a functionality of the re-usable component;
   automatically generating an updated code definition of the re-usable component modified based on the customization code;
   creating a new re-usable component in accordance with the updated code definition; and
   presenting the new re-usable component in place of the re-usable component as the interface portion for display across the interface in a package received by and installed at a specific client; thereby enabling customizing the interface installed at and specific to the client with a re-usable component including the customization code used among a plurality of users in interfaces installed at and customized to respective ones of the plurality of users.

2. The method of claim 1, wherein generating a re-usable component based on a next unique identifier in a sequence of not yet used unique identifiers includes:
receiving a name and definition for a re-usable code component as text;
converting the text for the name and the definition to a mark-up language; and
generating the re-usable code component based on the mark-up language for integration into an interface.

3. The method of claim 2, wherein the text is received as input to input fields of an interface.

4. The method of claim 1, wherein the automatically generating an updated code definition of the re-usable component based on the customization code includes:
updating an attribute of the code definition of the re-usable component based on the customization code, wherein the updating includes specifying at least one database.

5. The method of claim 4, further including:
accessing at least one value from the database;
automatically executing the code definition based on the value; and
presenting results across an interface page generated by the execution.

6. The method of claim 1, wherein the code definition specifies a manner to render output.

7. The method of claim 1, wherein the receiving from a user customization code includes:
receiving an input via another re-usable component of an interface page, the another re-usable component different from the re-usable component.

8. The method of claim 1, further including:
receiving a reference within a page to the re-usable component, the reference including code for specifying a manner to render output; and
wherein the automatically generating an updated code definition of the re-usable component based on the customization code includes:
inserting the code for specifying a manner to render output within an area of the re-usable component for receiving input of an unspecified type.

9. The method of claim 8, wherein the code that specifies a manner to render output includes code for modifying a resulting output of a first re-usable component that takes as input an output of a second re-usable component.

10. The method of claim 1, wherein the code definition includes one or more restrictions placed on types of changes that a user may make to the re-usable component.

11. The method of claim 1, further including checking that an identifier includes a name available to the specific client.

12. The method of claim 1, further including checking that an identifier is not yet used to refer to any other re-usable component of other users.

13. A method of automatically creating a re-usable component for a user-interface, the method including:
receiving by a server of a shared on-demand database a request to include, in a code definition of a first re-usable component having access to one or more fields of the shared on-demand database, a reference to a body re-usable component;
responsive to the request, automatically generating a name and a code definition for a second re-usable component based on at least:
a next unique identifier in a sequence of not yet used unique identifiers that are available and are valid for a specific client; and
a code definition of a pre-determined re-usable component template; and
instantiating a second re-usable component from the first re-usable component the instantiating based on the name, as automatically generated, and code definition of the body re-usable component; and
presenting the second re-usable component as a panel portion for display across an interface in a package received by and installed at a specific client; thereby enabling customizing the interface installed at and specific to the specific client with a re-usable component including customization code used among a plurality of users in interfaces installed at and customized to respective ones of the plurality of users.

14. The method of claim 11, wherein automatically generating a name and a code definition for the second re-usable component includes:
receiving the name and code definition of the body re-usable component as text;
converting the text for the name and the code definition to a mark-up language; and
generating the code definition for a second re-usable component based on the mark-up language for integration into an interface.

15. The method of claim 14, wherein the text is received as input to input fields of an interface.

16. A non-transitory computer readable storage medium impressed with computer program instructions to automatically create a re-usable component for a user-interface, which instructions, when executed on a processor, implement a method comprising:
automatically generating by a server of a shared on-demand database a re-usable component having access to one or more fields of the shared on-demand database based on a next unique identifier in a sequence of not yet used unique identifiers that are available and are valid for a specific client;
wherein the re-usable component includes a code definition adopted from a pre-determined re-usable component template;
presenting the re-usable component as an interface portion for display across an interface installed at and specific to a client;
receiving from a user, customization code that modifies a functionality of the re-usable component;
automatically generating an updated code definition of the re-usable component modified based on the customization code;
creating a new re-usable component in accordance with the updated code definition; and
presenting the new re-usable component in place of the re-usable component as the interface portion for display across the interface in a package received by and installed at a specific client; thereby enabling customizing the interface installed at and specific to the client with a re-usable component including the customization code used among a plurality of users in interfaces installed at and customized to respective ones of the plurality of users.

17. The non-transitory computer readable storage medium of claim 16, implementing the method further comprising:

updating an attribute of the code definition of the re-usable component based on the customization code, wherein the updating includes specifying at least one database;

accessing at least one value from the database;

automatically executing the code definition based on the value; and presenting results generated by the executing the code definition across an interface page.

18. The non-transitory computer readable storage medium of claim 16, implementing the method further comprising:

receiving a reference within a page to the re-usable component, the reference including code for specifying a manner to render output; and wherein the automatically generating an updated code definition of the re-usable component based on the customization code includes:

inserting the code for specifying a manner to render output within an area of the re-usable component for receiving input of an unspecified type.

19. The non-transitory computer readable storage medium of claim 18, wherein the code that specifies a manner to render output includes code for modifying a resulting output of a first re-usable component that takes as input an output of a second re-usable component.

20. The non-transitory computer readable storage medium of claim 16, wherein the code definition includes one or more restrictions placed on types of changes that a user may make to the re-usable component.

21. The non-transitory computer readable storage medium of claim 16, implementing the method further comprising: checking that an identifier includes a name available to the specific client.

22. The non-transitory computer readable storage medium of claim 16, implementing the method further comprising: checking that an identifier is not yet used to refer to any other re-usable component of other users.

* * * * *